United States Patent [19]

Pitoiset

[11] 4,432,743
[45] Feb. 21, 1984

[54] VARIABLE SPEED DRIVE PULLEY

[75] Inventor: Didier Pitoiset, Montmorency, France

[73] Assignee: Valeo, Paris, France

[21] Appl. No.: 308,461

[22] Filed: Oct. 5, 1981

[30] Foreign Application Priority Data

Oct. 9, 1980 [FR] France .................. 80 21571

[51] Int. Cl.³ ............................ F16H 55/56
[52] U.S. Cl. ......................... 474/14; 474/46
[58] Field of Search ............ 474/15, 28, 46, 14

[56] References Cited

U.S. PATENT DOCUMENTS

| | | | |
|---|---|---|---|
| 824,022 | 6/1906 | James | 474/46 |
| 2,289,573 | 7/1942 | Almen | 474/43 |
| 3,064,486 | 10/1962 | Aplin | 474/37 |
| 3,129,597 | 4/1964 | Prior | 474/46 |
| 3,358,520 | 12/1967 | Heydlauf et al. | 474/46 |
| 3,948,111 | 4/1976 | Dittrich | 474/28 |
| 4,137,786 | 2/1979 | Fenart | 474/46 |
| 4,216,678 | 8/1980 | Butterfield et al. | 474/46 |

FOREIGN PATENT DOCUMENTS 2434316 3/1980 France .

384318 2/1965 Switzerland .................. 474/28

*Primary Examiner*—John E. Murtagh
*Assistant Examiner*—Andrew Joseph Rudy
*Attorney, Agent, or Firm*—Charles E. Brown

[57] ABSTRACT

A variable speed device pulley is disclosed of the type comprising a fixed pulley half and movable pulley half facing each other and fixed for rotation with a rotatable shaft. An annular abutment is fixed for rotation with and bears axially against the rotatable shaft. A return spring, e.g., a diaphragm spring, bears axially against the abutment member to urge the movable pulley half toward the fixed pulley half. The annular abutment member comprises a bearing component and a contact component bearing axially against each other. The bearing component is fixed relative to the rotatable shaft and the bearing component is fixed relative to the return spring. The contact component is floatingly mounted on the bearing component for limited shifting movement transversely relative to the axis of the rotatable shaft. The floating mounting may comprise elastic bushes or rings, leaf springs or an intermediate component with sliders. The floating mounting may also permit axial and/or circumferential shifting of the contact component.

20 Claims, 15 Drawing Figures

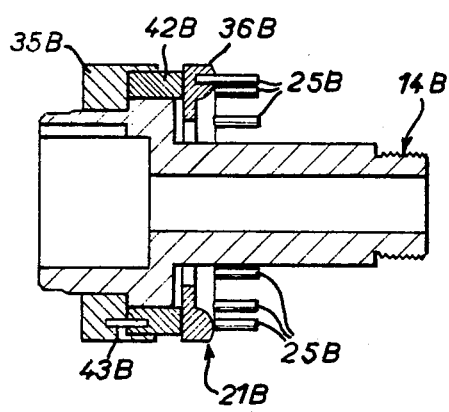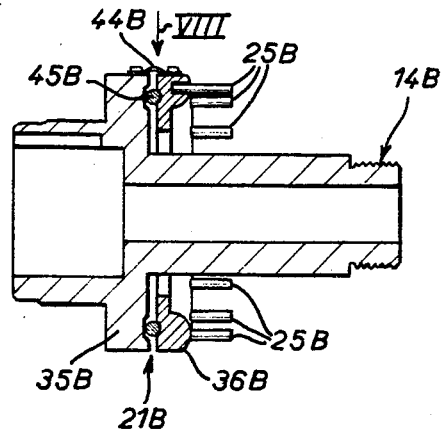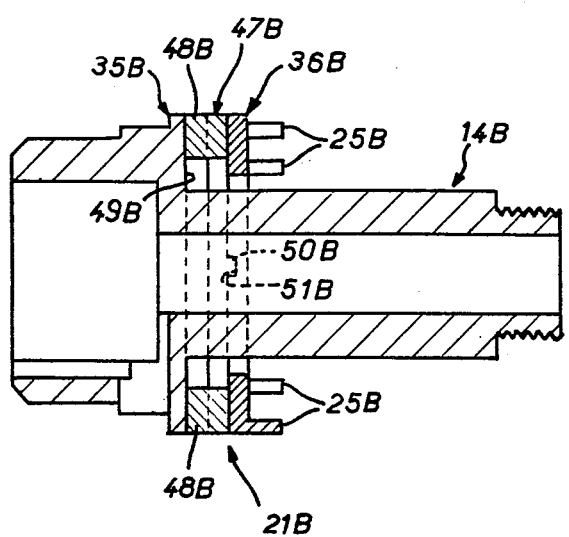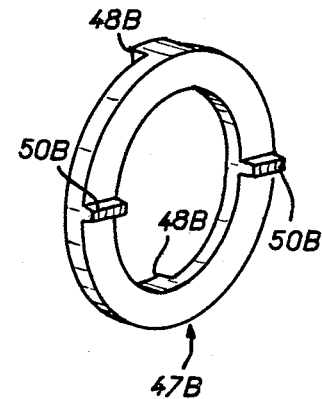

VARIABLE SPEED DRIVE PULLEY

FIELD OF THE INVENTION

The present invention relates generally to motor-driven, belt-type variable speed devices or drives for driving, for example in a motor vehicle, an auxiliary device such as an alternator, water pump or a fan usually equipping such a vehicle.

BACKGROUND OF THE INVENTION

As is known per se, such a variable speed drive comprises a driving and a driven pulley with parallel axes, and an endless belt looped over the pulleys. Each of the pulleys generally comprises two coaxial pulley halves facing each other and fixed for rotation with a rotatable shaft. One of the pulley halves referred to as the fixed pulley half is, in operation, axially fixed to the rotatable shaft and the other pulley half, known as the movable pulley half, is mounted for axially movement with respect to the fixed half, at least part of a side of at least one of the pulley halves is frustoconical. Resilient return means bear axially against an annular abutment member fixed for rotation with the rotatable shaft and axially fixed with respect thereto, urging the movable pulley half in the direction of the fixed pulley half.

The present invention relates more particularly though not exclusively to the case in which the resilient return means associated with the movable pulley half of one such pulley comprise a diaphragm spring having a Belleville washer peripheral portion which bears axially against the movable pulley half and a central portion divided into radial fingers which bears axially against the associated abutment member.

One of the problems posed in the construction of variable speed drive pulleys of this type is to limit, insofar as possible, the wear produced in contact between the diaphragm spring and the abutment.

It has been found that in service the movable pulley half of such a pulley is subjected to an eccentric movement around the rotatable shaft by reason of the action of the belt thereon being exerted only along a fraction of the circumference and this eccentric movement is transmitted by the diaphragm spring to the movable member. This is, of course, a movement of small magnitude but which, being repeated each revolution of the pulley, is gradually the cause of the pronounced wear of the diaphragm spring fingers in contact with the abutment member against which they bear, the hardness of the fingers generally being less than that of the abutment member.

SUMMARY OF THE INVENTION

According to the invention there is provided a variable speed drive pulley of the type comprising a fixed pulley half and a movable pulley half facing each other and fixed for rotation with a rotatable shaft, said fixed pulley half being axially connected in operation to said rotatable shaft, said movable pulley half being mounted for axial movement relative to said rotatable shaft, at least part of a side of one of said pulley halves being frustoconical, an annular abutment member fixed for rotation with and bearing axially against said rotatable shaft, resilient return means bearing axially against said annular abutment member and urging said movable pulley half in the direction of said fixed pulley half, said annular abutment member comprising a bearing component and a contact component bearing axially against each other, said bearing component being fixed axially relative to said rotatable shaft, said contact component being fixed axially relative to said resilient return means, the improvement comprising means floatingly mounting said contact component with respect to said bearing component for limited shifting movement transversely relative to the axis of said rotatable shaft.

Thus, according to the invention advantageously the contact component is not fixed transversely relative to the rotatable shaft, although contact component is fixed for rotation with the rotatable shaft, and this transverse freedom permits the contact component to follow at all times the eccentric movement which the resilient means are subjected to, in operation, relative to the rotatable shaft.

No wear thus develops between the bearing component and the resilient means.

The features and advantages of the invention will be brought out in the description which follows, given by way of example, with reference to the accompanying schematic drawings.

BRIEF DESCRIPTION OF THE DRAWINGS

FIGS. 6 and 7 are views of part of FIG. 1 for two other alternative embodiments;

FIG. 8 is a fragmentary plan view taken in the direction of arrow VIII of FIG. 7 of the alternative embodiment of that figure;

FIG. 9 corresponds, like FIGS. 6 and 7, to part of FIG. 1 for another embodiment;

FIG. 10 is a perspective view of one of the components of the abutment member of the embodiment of FIG. 9.

DETAILED DESCRIPTION OF THE PREFERRED EMBODIMENTS

Figure 1:
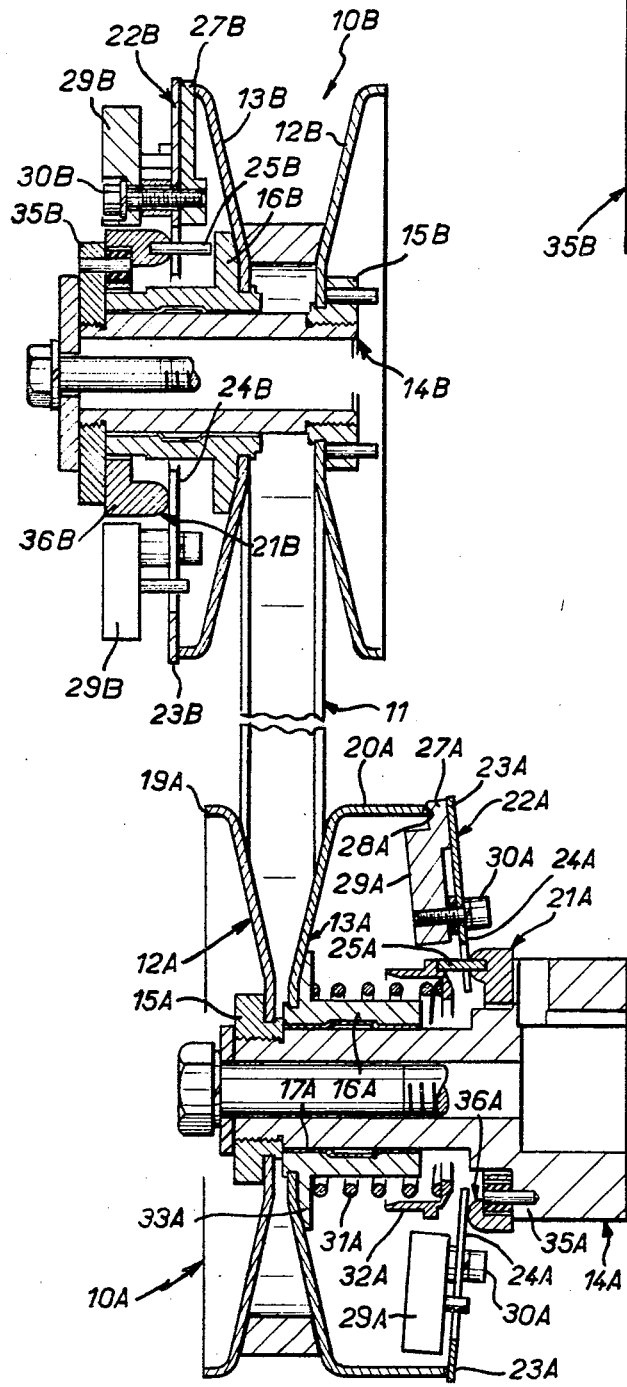
FIG. 1 is a longitudinal sectional view of a variable speed drive comprising pulleys embodying the invention.
Figures 2, 3:
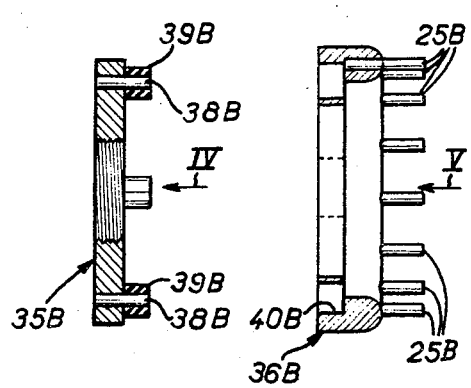
FIG. 2 is a longitudinal sectional view of one of the components of the abutment member of one of the pulleys.
FIG. 3 is a longitudinal sectional view of the other components of the abutment member.
Figure 4:
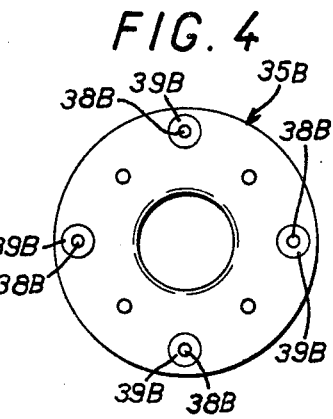
FIGS. 4 and 5 are elevational views of the components respectively taken in the direction of arrows IV and V in FIGS. 2 and 3.
Figure 5:
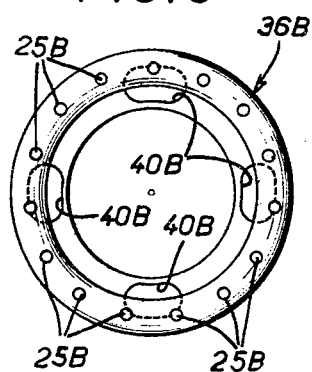

In FIG. 1 will be recognized a speed change device or drive conventionally comprising a driving pulley 10A, a driven pulley 10B and an endless drive belt 11 looped over the pulleys which, as illustrated, is a V-belt, that is, a belt of trapezoidal cross section.

The driving pulley 10A comprising two coaxial pulleys 12A, 13B with frustoconical sides fixed for rotation with a rotatable shaft 14A which in practice is a driving shaft and fixed, for example, for rotation with the output shaft of a vehicle engine (not shown); alternatively, a single one of the pulley halves 12A, 12B may have a frustoconical side or even merely a frustoconical part.

The pulley 12A referred to for the sake of convenience as the fixed pulley half is in operation connected axially to the rotatable shaft 14A and is for example carried by a hub 15A secured by bolting to the end of the rotatable shaft 14A. Thus it is demountable to permit the changing of the belt.

The pulley half 13A, referred to as the movable pulley half, is movably mounted axially relative to the rotatable shaft 14A. For example, as shown, the pulley half 13A is carried by a hub 16A having an antifriction material 17A lining a groove disposed midway along the inner surface of the hub 16A and is slidably mounted on the rotatable shaft 14A.

Each of the pulley halves 12A, 13A is provided at its periphery with an axially directed flange 19A, 20A extending away from each other.

The movable pulley half 13A is urged or biased in the direction of the fixed pulley half 12A by resilient return means bearing axially against an annular abutment member 21A, fixed for rotation with the rotatable shaft 14A as will be described below and bearing axially against the rotatable shaft 14A.

In the embodiments disclosed herein there are two different types of resilient return means. First of all, and most important, is a diaphragm spring 22A comprising a circularly continuous Belleville washer peripheral portion 23A and a central portion divided into radial fingers 24A. The ends of the radial fingers bear axially against the abutment member 21A. The Belleville washer peripheral portion 23A bears against the free edge of the axial flange 20A of the movable pulley half 13A.

Other than its resilient return function the diaphragm spring 22A has a second function in the embodiments incorporating the same which is to ensure the rotational driving of the movable pulley half 13A. To this end the radial fingers 24A of the diaphragm spring are provided with slots or apertures for engagement with lugs 25A protruding axially from the abutment member 21A. The Belleville washer peripheral portion 23A of the diaphragm spring 22A has axially protruding pads 27A which are each in engagement with notches 28A in the axial flange 20A of the movable pulley half 13A. In the illustrated embodiment of FIG. 1 these pads 27A are defined by the extensions on weight members 29A, each individually fixed to fingers 24A of the diaphragm spring 22A by screws 30A. Only some of the weight members 29A have the protruding pads 27A.

The other type of resilient return means comprises a coil spring 31A bearing against a cup-shaped member 32A which in turn bears axially against the lugs 25A on the abutment member 21A, the coil spring 31A axially supporting a radial flange 33A on the hub 16A of the movable pulley half 13A.

The overall structure of the driven pulley 10B is similar: the fixed pulley half 12B with a hub 15B connected axially, in operation, to a rotatable shaft 14B, a movable pulley half 13B carried by a hub 16B slidably mounted on the rotatable shaft 14B, and a diaphragm spring 22B which bears axially against an annular abutment member 21A urges the movable pulley half 13B in the direction of the fixed pulley half 12B.

Still, in the embodiments, the diaphragm spring 22B itself comprises the entire resilient return means associated with the movable pulley half 13B, no additional coil spring being provided, and the weight members 29B are separate from the pads 27B though secured to the radial fingers 24B of the diaphragm spring 22B by screws 30B, as above.

Further, the rotatable shaft 14B is adapted to be fixed for rotation with a driving shaft for some sort of device, such as a water pump, and/or fixed to another pulley for receiving some other force-transmitting belt (not shown).

These features are known per se and do not in themselves constitute the novelty of the present invention and need not be described in greater detail herein.

According to the invention each abutment member 21A, 21B is divided into two components axially bearing against each other, namely, a bearing component 35A, 35B which bears axially against or is integrally formed with the rotatable shaft 14A, 14B of the corresponding pulley and in any event is fixed axially relative to the rotatable shaft, and a contact component 36A, 36B against which the resilient return means associated with corresponding movable pulley half 13A, 13B bears or forms an integral part of and in any event is fixed axially relative to the resilient return means; the contact member 36A, 36B is floatingly mounted at least transversely and optionally axially relative to the bearing component 35A, 35B.

In the embodiment illustrated in FIGS. 1–5, in the driving pulley 10A, the bearing component 35A of the abutment member 21A is an integral part of the rotatable shaft 14A and comprises a transverse shoulder thereon, and in the driven pulley 10B the bearing member 35B comprises a part separate from the rotatable shaft 14B such as a disk bolted to the end of the rotatable shaft 14B. In any event the bearing component is fixed for rotation with the rotatable shaft 14A.

Aside from the foregoing difference the arrangements adopted in the illustrated embodiment of FIGS. 1–5 are similar for the driving pulley 10A and the driven pulley 10B, and are better distinguished with regard to driven pulley 10B which will be described below with respect to that pulley.

The bearing component 35B carries axially projecting pins 38B, four as shown, uniformly angularly spaced in a circle. Each of the pins 38B is generally cylindrical and in the illustrated embodiment comprises an elastic bush 39B.

In conjunction therewith the associated contact component 36B has recesses 40B on its transverse side opposite from the side carrying the projecting lugs 25B. In the illustrated embodiment the recesses are each circumferentially oblong.

The pins 38B of the bearing component 35B with their respective elastic bushes 39B are each received with play in corresponding recesses 40B in the contact component 36B.

Owing to the floating mounting thus defined the contact component 36B can advantageously being displaced or give freely radially relative to the bearing component 35B while remaining fixed for rotation therewith and therefore capable of freely following the eccentric movement relative to the rotatable shaft to which the movable pulley side 13B and therefore the diaphragm spring are subjected without displacement relative to the diaphragm spring which is always a source of wear.

As will be noted, in this embodiment, the contact component 36B normally bears axially against the bearing component 35B and its floating mounting is operative in practice only transversely, that is, in a plane perpendicular to the axis of the pulley. Rocking of the contact component 36B relative to the bearing component 35B may occasionally occur.

According to a nonillustrated embodiment the contact component 36B carries the pins and the recesses are formed in the bearing component 35B.

In the alternative embodiment illustrated in FIG. 6, the contact component 36B of the bearing member 21B is connected to the bearing component 35B by a ring 42B which is made of elastically deformable material and is fixed for rotation with both of the components of the bearing member. For example, as shown, the ring 42B may be bonded, e.g., glued or vulcanized, to the contact component 36B and connected by axial pins 43B to the bearing component 35B. In any event, owing to the ring 42B of elastically deformable material a floating mounting is established between the contact component 36B and the bearing component 35B by the mere elastic deformation of the ring.

As will be noted, in this embodiment, the contact component 36B is floatingly mounted relative to the bearing component 35B both transversely and axially, i.e., perpendicular and parallel to the axis of the pulley. In addition it is circumferentially floatingly mounted, i.e., along a circumference centered at the axis. In this embodiment the ring 42B is the only part disposed between it and the bearing component 35B or the rotatable shaft 14B and the diaphragm spring 22B.

In the FIG. 6 embodiment the bearing member 35B forms, as above, a part separate from the rotatable shaft 14B suitably fixed for rotation therewith, e.g., force-fitted.

In the alternative embodiment illustrated in FIGS. 7 and 8, the bearing component 35B forms an integral part of the rotatable shaft 14B by forming, as on the driving shaft 10A a mere transverse shoulder.

In the alternative embodiment of FIGS. 7 and 8, the contact component 36B is connected to the bearing component 5B by leaf springs 44B or other resiliently deformable connections. As shown the leaf springs 44B each comprise a suitably bowed central cross bar of an H-shaped element whose legs are fixed respectively to the contact component 36B and the bearing component 35B.

Further, in this embodiment an annular seal or O-ring 45B is interposed between the contact component 36B and the bearing component 35B.

In the alternative embodiment of FIGS. 9 and 10, the abutment member 21B comprises a bearing component 35B which, as shown, is an integral part of the rotatable shaft 14B, a contact component 36B and an intermediate component 47B defining a spider disposed between the bearing component 35B and the contact component 36B. The spider 47B is in sliding engagement with the bearing component through slider means for displacement in a first transverse direction and in sliding engagement with the contact component through other slider means for displacement in a second transverse direction perpendicular to the first transverse direction.

In the illustrated embodiment the intermediate component 47B comprises a flat annular member having on one side straight, projecting sliders 48B slidably engageable with a diametral groove 49B in the bearing component 35B, and on the other side, at right angles to the first, straight, projecting sliders 50B slidably engageable with a diametral groove 51B in the bearing component 36B.

Accordingly, the contact component is thus moveably mounted in two transverse directions relative to the bearing component 35B thus providing the floating mounting for movement in a transverse plane, according to the invention. In the FIGS. 9 and 10 embodiment the component parts of the abutment member 21B are in contact with each other along a transverse plane.

According to a nonillustrated embodiment at least two such component parts are in contact with one another along spherical surfaces; such a spherical contact surface may be disposed between the bearing component and the intermediate component and/or between the intermediate component and the contact component. This arrangement may also be adopted in at least some of the preceding embodiments, namely that of FIGS. 1-5.

In the several embodiments of FIGS. 11-15 relative to the driving pulley 10A the abutment member 35A is formed by an annular flange swaged along its inner periphery to the rotatable shaft 14A and, as shown in the embodiment of FIG. 6, a ring 42A of elastically deformable material connects the bearing component 35A to the associated contact component 36A. In the various illustrated embodiments of FIGS. 11-14 the ring 42A is bonded, e.g., glued or vulcanized, directly to the bearing component 35A as well the contact component 36A and the spring 31A bears directly against the bearing component 35A.

Figure 11:
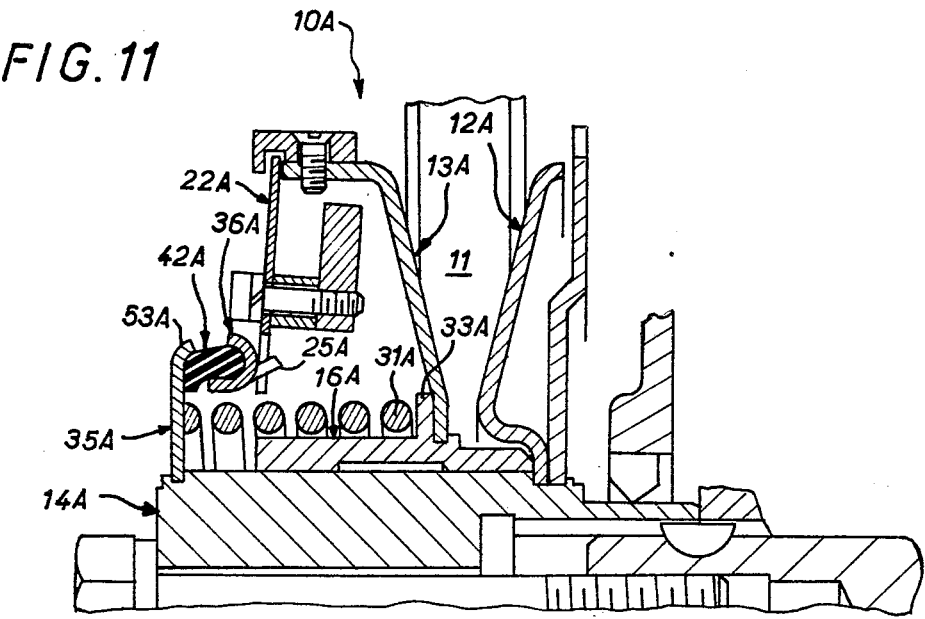
FIGS. 11–15 are half longitudinal sectional views of embodiments of pulleys of the invention.

In the illustrated embodiment of FIG. 11, the bearing and contact components 35A and 36A are die stamped. The bearing component 35A has at its outer periphery a rounded rim 53A which is in engagement with the ring 42A for its centering. The contact component 36A is generally semicircular in cross-section for receiving the ring 42A. The diaphragm spring bears against the convex side of the contact component 36A and lugs 25A are integrally formed angularly spaced strikes.

Figure 12:
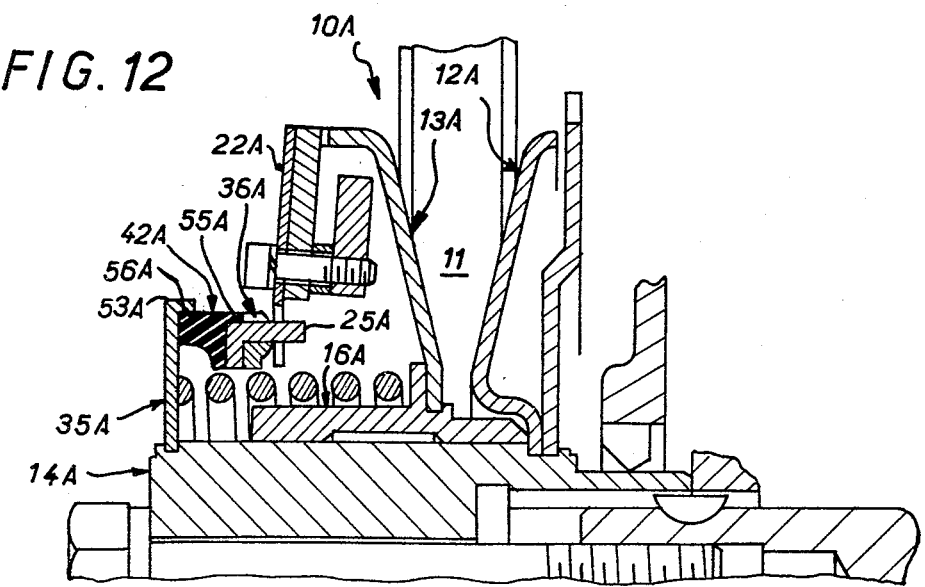
Figure 13:
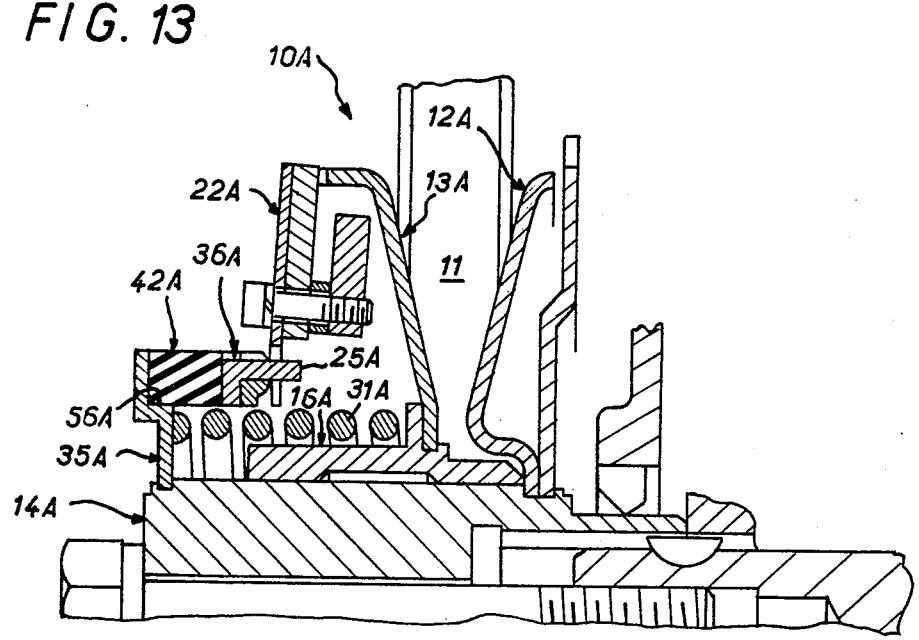

In the embodiments of FIGS. 12 and 13 at least the contact component 36A is a machined part. It may be formed in one piece or as shown two interengaging pieces, one carrying the lugs 25A and the other having a rounded annular boss for bearing contact with the diaphragm spring 22A.

In the embodiment of FIG. 12 the contact component 36A comprises a cylindrical bearing surface 55A by which it is in engagement with the ring 42A. The rim 53A of the bearing component 35A likewise forms a cylindrical bearing surface 56A in engagement with the outer surface of the ring 42A to center the same. In other words in the embodiment of FIG. 12 the ring 42A is tightly fitted on both the bearing and contact components 35A and 36A.

In the embodiment of FIG. 13 the ring 42A is tightly fitted only on the bearing component 35A which is provided with a cylindrical bearing surface 56A disposed radially inwardly of the outer periphery of the bearing component. The ring 42A is in contact with the cylindrical bearing surface 56A along its inner periphery and bonded, e.g., glued or vulcanized thereto.

Figure 14:
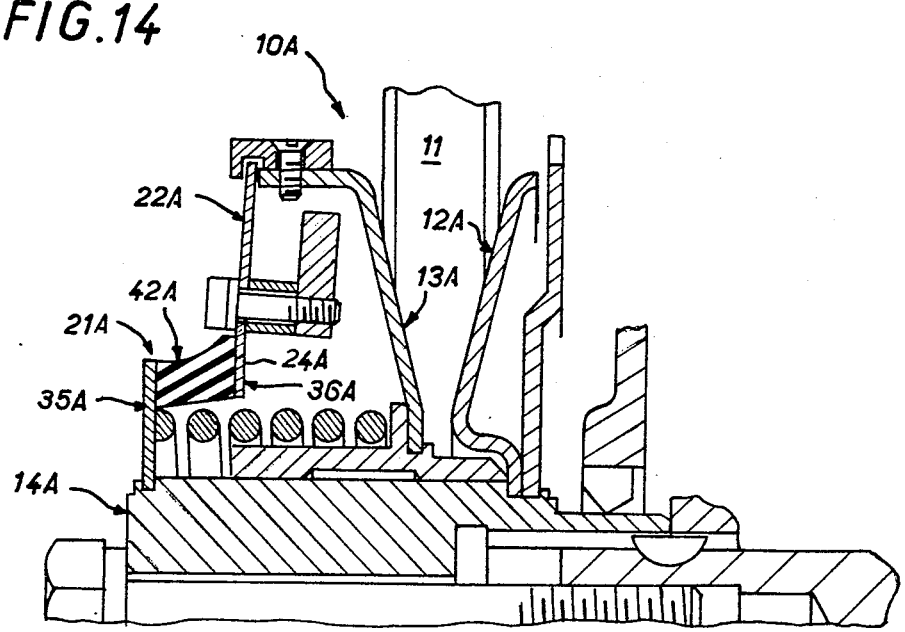

In the FIG. 14 embodiment no force-fitting is provided; the annular flange 14 defining the bearing component 35A is flat. The contact component 36A is integrally formed with the radially inner ends of the radial fingers 24A and the ring 42A is bonded, e.g., glued or vulcanized, directly to the flange and the diaphragm fingers.

As will be noted, the rotational connection of the diaphragm spring 22A with the bearing component 21A does not involve the provision of rigid lugs in engagement or meshing with such a diaphragm spring thus favoring the reduction of noise.

But as in the case of the FIG. 6 embodiment the torque transmitted by the rotatable shaft 14A and the diaphragm spring 22A follows a path through the ring 42A of elastically deformable material so that the ring transmits torque in addition to its axial bearing and mounting function.

Figure 15:
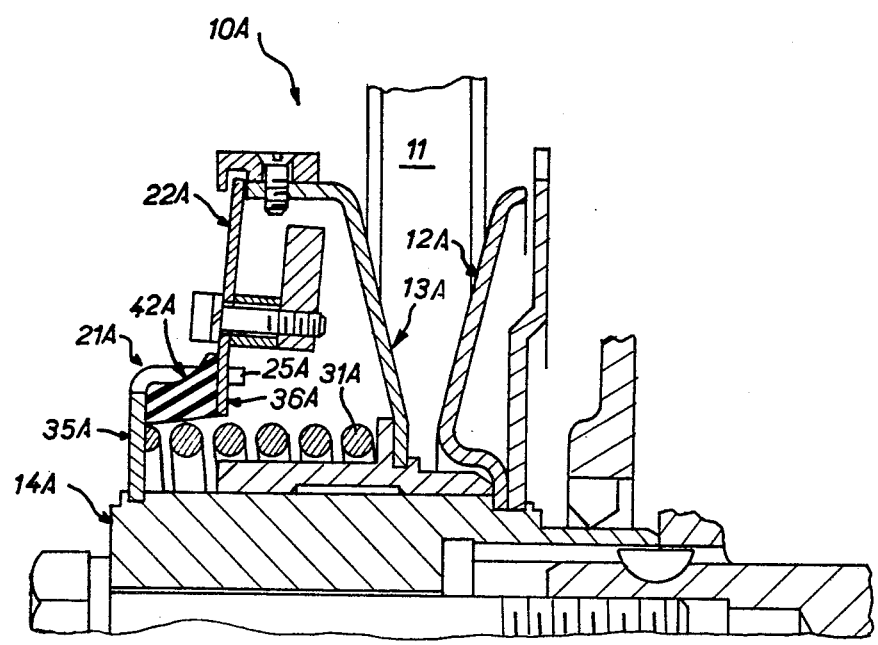

Such is not the case with the embodiment of FIG. 15 in which lugs 25A are provided which are in engagement with the diaphragm spring 22A and integrally formed with the bearing component 25A defined by axial tongues at the outer periphery thereof. The torque transmitted therefore passes directly from the bearing component 35A to the diaphragm spring 22A in the embodiment, and the floating mounting between the contact component 36A formed here by the inner ends of the radial fingers and the bearing component 35A is effective only axially and transversely and not circumferentially.

It is to be observed that in the illustrated embodiments of FIGS. 14 and 15, the elastically deformable ring 42A is not necessarily a continuous mass, but on the contrary, on the diaphragm spring side may comprise notches in registration with the slots (not shown) between adjacent radial fingers of the diaphragm spring 22A.

The present invention is, moreover, not limited to the various described and illustrated embodiments but includes all modifications and alternatives as will be understood by those skilled in the art, without departing from the spirit and scope of the invention. In particular, the bearing component and contact component arrangements may be reversed. Further, as mentioned above, the features of the driven pulley 10B may be adopted for the driving pulley 10A and vice versa. Furthermore, as will be noted in most of the illustrated embodiments, additional resilient return means for returning the diaphragm spring to its centered position are provided thereby minimizing any imbalance and prolonging the service life of the variable speed drive.

What I claim is:

1. A variable speed drive pulley comprising a fixed pulley half and a movable pulley half facing each other and fixed for rotation with a rotatable shaft, said fixed pulley half being axially connected in operation to said rotatable shaft, said movable pulley half being mounted for axial movement relative to said rotatable shaft, at least part of a side of one of said pulley halves being frustoconical, an annular abutment member fixed for rotation with and bearing axially against said rotatable shaft, resilient return means comprising a diaphragm spring bearing axially against said annular abutment member and urging said movable pulley half in the direction of said fixed pulley half, said annular abutment member comprising a bearing component and a contact component bearing axially against each other, said bearing component being fixed axially relative to said rotatable shaft, said diaphragm spring being fulcrumed on said contact component, said diaphragm spring being fixed axially and circumferentially relative to said contact component, the improvement comprising means floatingly mounting said contact component with respect to said bearing component for permitting limited shifting movement with said diaphragm spring transversely relative to the axis of said rotatable shaft.

2. The pulley according to claim 1, wherein said means floatingly mounting said contact component comprises an elastic mounting.

3. The pulley according to claim 1, wherein said means floatingly mounting said contact component also permits axial shifting movements thereof with respect to said bearing component.

4. The pulley according to claim 1, wherein said means floatingly mounting said contact component comprises projecting pins on one of said components and recesses in the other of said components, said projecting pins being received in said recesses with play in a plane perpendicular to the axis of said rotatable shaft.

5. The pulley according to claim 4, wherein said means floatingly mounting said contact component further comprises elastic bushes received on said projecting pins.

6. The pulley according to claim 5, wherein said recesses are circumferentially elongated.

7. The pulley according to claim 1, wherein said means floatingly mounting said contact component also permits limited shifting in the circumferential direction.

8. The pulley according to claim 7, further comprising a seal interposed between said components.

9. The pulley according to claim 1, wherein said means floating by mounting said contact component comprises an intermediate component, said intermediate component comprising means slidably engageable with said bearing component for displacement in a first direction and means slidably engageable with said contact component for displacement in a second transverse direction perpendicular to said first transverse direction.

10. The pulley according to claim 1, wherein said components are in contact along a transverse plane perpendicular to the axis of said rotatable shaft.

11. The pulley according to claim 1, wherein said components are in contact with each other along a transverse spherical surface.

12. The pulley according to claim 3, wherein said means floatingly mounting said contact component also permits limited shifting in the circumferential direction.

13. A variable speed drive pulley comprising a fixed pulley half and a movable pulley half facing each other and fixed for rotation with a rotatable shaft, said fixed pulley half being axially connected in operation to said rotatable shaft, said movable pulley half being mounted for axial movement relative to said rotatable shaft, at least part of a side of one of said pulley halves being frustoconical, an annular abutment member fixed for rotation with and bearing axially against said annular abutment member and urging said movable pulley half in the direction of said fixed pulley half, said annular abutment member comprising a bearing component and a contact component bearing axially against each other, said bearing component being fixed axially relative to said rotatable shaft, said resilient return means being fixed axially relative to said contact component, the improvement comprising means floatingly mounting said contact component with respect to said bearing component for permitting limited shifting movement of said contact member with said resilient return means transversely relative to the axis of said rotatable shaft, said means floatingly mounting said contact component comprising an elastic mounting.

14. The pulley according to claim 13, wherein said means floatingly mounting said contact component comprises a ring of deformable elastic material fixed for rotation with both of said components.

15. The pulley according to claim 7, wherein a rim is formed on one of said components, said elastic ring being in engagement with said rim.

16. The pulley according to claim 14, wherein one of said components comprises a cylindrical bearing surface, said elastic ring being in engagement with said cylindrical bearing surface.

17. The pulley according to claim 14, wherein said elastic ring is bonded to at least one of said components.

18. The pulley according to claim 17, said resilient return means comprising diaphragm spring having a Belleville washer peripheral portion and a central portion divided into radial fingers, wherein said contact component is integrally formed with said diaphragm spring at the ends of said radial fingers, said elastic ring being bonded directly to said radial fingers.

19. The pulley according to claim 13, wherein said means floatingly mounting said contact component comprises leaf springs interconnecting said contact component and said bearing component.

20. The pulley according to claim 13, wherein said means floatingly mounting said contact component also permits axial shifting movements thereof with respect to said bearing component.

* * * * *